Feb. 15, 1955    J. W. BOTTERILL ET AL    2,702,311
TERMINAL FOR CABLE HAVING A PLURALITY
OF ALTERNATE CONDUCTORS
Filed July 1, 1949    2 Sheets-Sheet 1
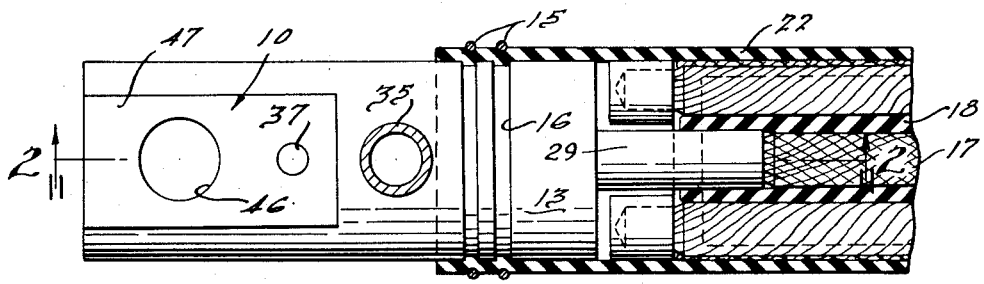
FIG. 1.
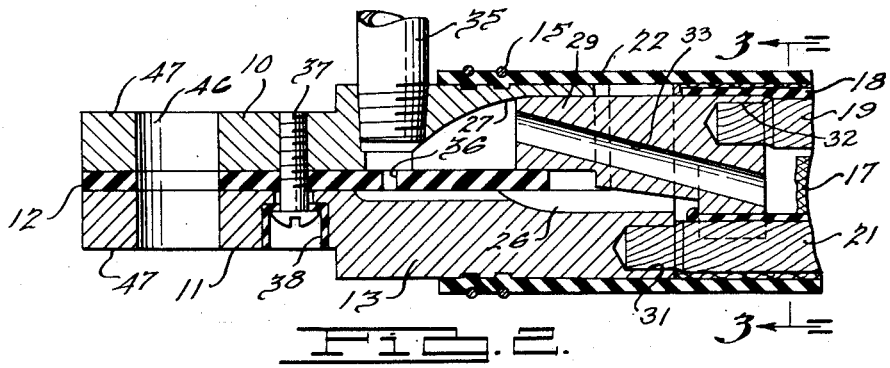
FIG. 2.
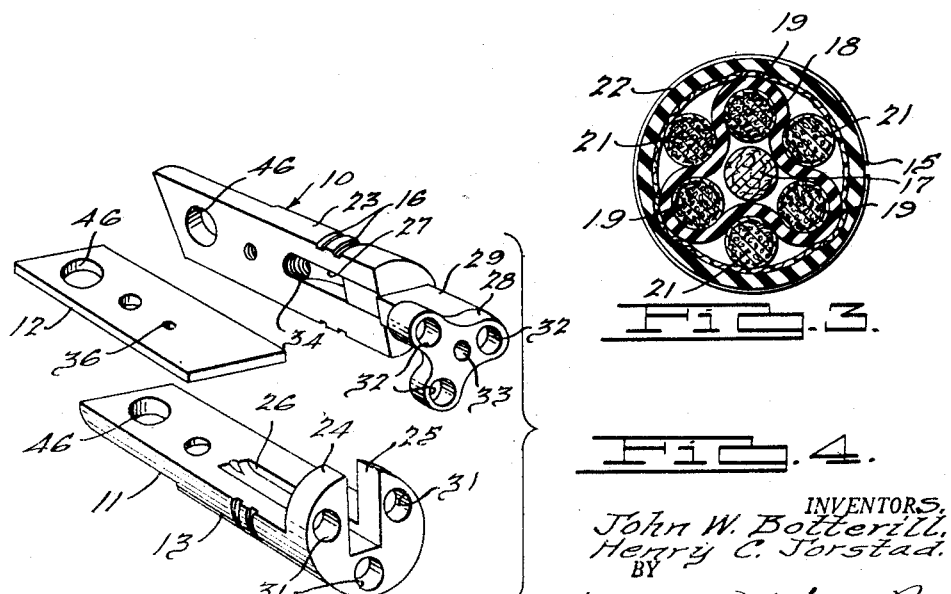
FIG. 3.
FIG. 4.
INVENTORS.
John W. Botterill.
Henry C. Jorstad.
BY
Harness, Dickey & Pierce
ATTORNEYS.

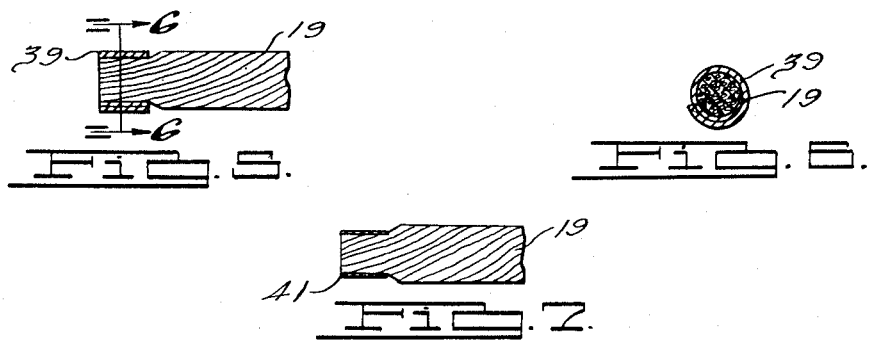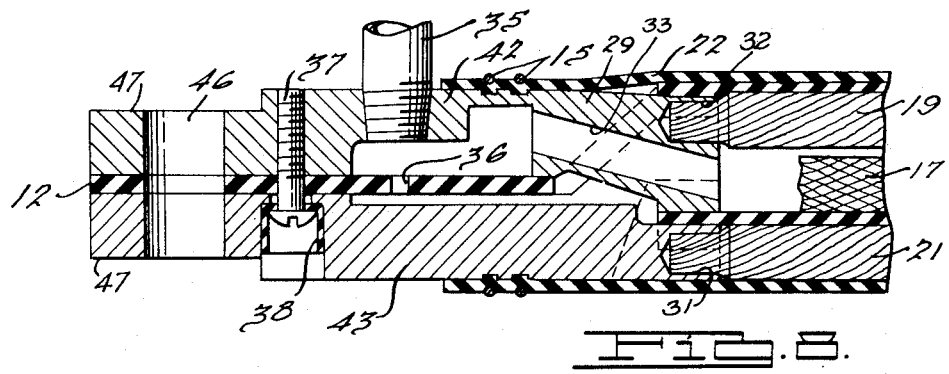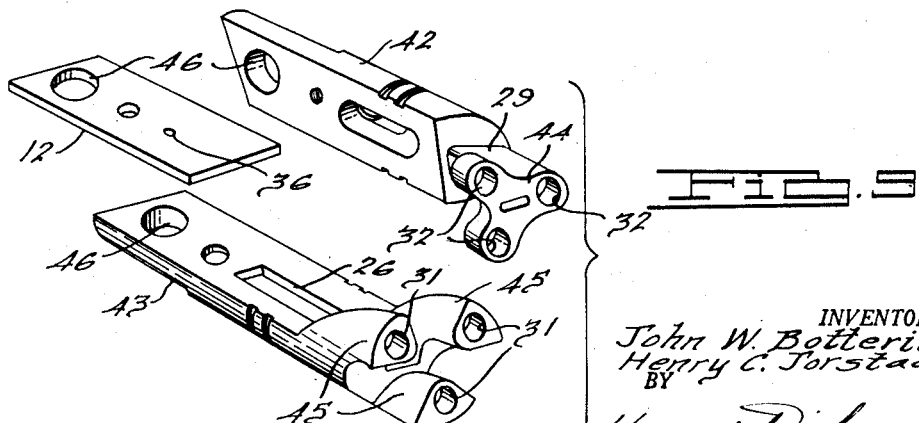

United States Patent Office 2,702,311
Patented Feb. 15, 1955

2,702,311

TERMINAL FOR CABLE HAVING A PLURALITY OF ALTERNATE CONDUCTORS

John W. Botterill, Huntington Woods, and Henry C. Jorstad, Detroit, Mich., assignors to Mackworth G. Rees, Inc., Detroit, Mich., a corporation of Michigan Application July 1, 1949, Serial No. 102,642

13 Claims. (Cl. 174—19)

This invention relates to cable terminals, and particularly to a unit cable terminal providing two leads for the end of a multiple conductor two-lead cable of the kickless type.

The cable for which the present terminal was invented is illustrated, described and claimed in the patent to Mackworth G. Rees, No. 2,320,470, issued June 1, 1943, for Current Delivering and Conducting Means. The cable is of the kickless flexible type having two leads made up of conductors alternately spaced on a circle about the longitudinal axis of the cable.

The terminal of the present invention is so constructed as to present contact portions for each of the conductor ends in the position in which they are located within the cable, that is to say, the conductors of one cable lead are alternately exposed relative to the conductor of the other lead and the terminal ends are presented in this manner to the ends of the conductors.

The terminal comprises two conducting elements which, when spaced by an insulating plate, form a cylinder to which the outer flexible sheath of the cable may be sealed so that water may be conducted through the terminal and the cable conductors. The terminal end adjacent to the cable is provided with a plurality of apertures, the alternate apertures forming the two leads, the same as the cable conductors, so that the conductors will extend into and be soldered within the apertures. Water passageways are provided in the terminals so that the water may be conducted about the conductors from one to the other end of the cable.

Accordingly, the main objects of the invention are: to provide a pair of terminals for the ends of a kickless cable having a plurality of conductors alternately disposed to provide a pair of cable leads, the terminal ends of the cables having apertures which are alternately arranged relative to the two leads so as to be aligned with the conductors thereof; to provide a terminal consisting of a pair of conductors having spaced apertures on adjacent ends which are offset relative to each other so as to be directly aligned with the alternately disposed conductors forming the two leads of the cable which are attached thereto when projected within the apertures; to provide a pair of conducting elements forming a terminal having alternately disposed apertures for attachment to a cable containing two leads made up of conductors alternately disposed which project directly into the apertures when attached thereto, the elements being provided with passageways for conducting a flow of water independently about the conductors of the respective leads, and, in general, to provide a terminal for each end of the multiple conductor cable which is simple in construction, compact in form and economical to manufacture.

Other objects and features of novelty of the invention will be specifically pointed out or will become apparent when referring, for a better understanding of the invention, to the following description taken in conjunction with the accompanying drawings, wherein:

Figure 1 is a broken sectional view of a cable end embodying features of the present invention;

Fig. 2 is a sectional view of the structure illustrated in Fig. 1, taken on the line 2—2 thereof;

Fig. 3 is a sectional view of the structure illustrated in Fig. 1, taken on the line 3—3 thereof;

Fig. 4 is an exploded view of the terminal illustrated in Figs. 1 and 2;

Fig. 5 is a longitudinal sectional view of the end of a conductor of the cable illustrated in Fig. 3;

Fig. 6 is a sectional view of the structure illustrated in Fig. 5;

Fig. 7 is a view of structure, similar to that illustrated in Fig. 5, showing another form thereof;

Fig. 8 is a sectional view of the terminal, similar to that illustrated in Fig. 2, showing a further form which the invention may assume, and Fig. 9 is an exploded view of the terminal illustrated in Fig. 8.

Referring to Figs. 1 to 4, a cable terminal is illustrated comprising a pair of conductors 10 and 11. The conductors are spaced and insulated from each other by an insulating plate 12 disposed therebetween. When so spaced by the insulating plate 12, the body 13 of the assembled conductors 10 and 11 forms a cylinder over which the outer sheath 22 of the cable projects and is sealed thereto by one or more clamping wires 15 secured thereabout. The wires are preferably applied over grooves 16 provided in the cylinder body portion of the assembled terminal.

The cable is of the kickless type, as illustrated in the above-mentioned patent, and comprises a central core element 17 and an insulating casing 18 of cloverleaf form which is disposed about the core and three conductors 19 of one lead forming a central water passageway through the cable. The conductors 21 of the opposite lead are disposed outside of the insulating casing 18 between the conductors 19. The insulating casing and the conductors of the two leads are disposed within the outer cylindrical sheath 22 of rubber or similar flexible material. This forms an outer water passageway about the lead comprising the conductors 21.

It will be noted from Fig. 3 that the conductors 19 of one lead are alternately disposed with relation to the conductors 21 of the other lead. One end of the terminal, comprising the conductors 10 and 11, is provided with alternate spaced apertures so that the apertures on one conductor are aligned with the conductors of one lead on the cable while the apertures on the other conductor are aligned with the conductors of the other lead. The location of the apertures is clearly disclosed in the exploded view of Fig. 4.

The conductors 10 and 11 of the terminal are formed from a round bar by sawing longitudinally therethrough with a saw of the width equal to the thickness of the insulating plate 12. The saw cut terminates inwardly from the end of the terminal 11 and a cross cut is then made to the first saw cut, producing the body portion 23 of the conductor 10. The head end 24 remaining on the terminal 11 is then provided with a slot 25, which slot extends into the body of the terminal 11 at 26 to provide a water passageway, as will be explained more clearly hereinafter. A slot 27 is provided in the body 23 of the conductor 10 in which a cloverleaf end 28 is secured in spaced relation therefrom by a neck portion 29 which is brazed, soldered or otherwise secured within the slot 27 in the conductor 10. Spaced apertures 31 are provided in the head 24 of the conductor 11, and similar apertures 32 are provided in the cloverleaf end 28 of the conductor 10.

The head 24 of the conductor 11 receives the neck portion 29 of the conductor 10 in spaced relation to the walls of the slot 25 and to the inner and outer surfaces thereof. When so assembled with the insulating plate 12 therebetween, the body portion 13 of the resulting terminal is of cylindrical form having the apertures 31 and 32 disposed in spaced planes and alternately located on a circle when viewed from the end about the longitudinal center line of the terminal. The apertures 31 and 32 of the conductors 10 and 11 of the terminals are aligned with the conductors 19 and 21 of the respective leads of the cable. Preferably, before severing of the bar into the separate conductors 10 and 11, the grooves 16 are machined in the outer surface in which the sheath 22 is securely anchored by the clamping wires 15. A cloverleaf end 28 of the conductor 10 has a sloping aperture 33 provided therethrough and through the neck portion 29 in communication with the slot 27. The slot communicates with a threaded aperture 34 to which a water conducting nipple 35 is secured in a suitable manner, herein illustrated as by a pipe thread. The plate 12 has an aperture 36 therethrough which, when assembled between the conductors 10 and 11 of the terminal, provides a passageway from the slot 27 into the slot 26 thereof. The size of the aperture is such as to meter the amount of water which is conducted from the slot 27 into the slot 26. The two conductors are secured together by a screw 37 which is threaded into the conductor 10 and which is insulated from the conductor 11 by an insulating cup 38. After the ends of the conductors 19 and 21 are soldered within the apertures 31 and 32, respectively, and the two conductors are secured together, the enclosing sheath 22 is attached to the body 13 of the cable by the clamping wires 15.

Various methods may be employed for attaching the conductors 19 and 21 to the conductors 10 and 11 of the terminal. One of such methods is illustrated in Figs. 5 and 6. A conductor 19 is illustrated having on the end thereof a coiled aluminum strip 39 which is applied in a manner to compress the wires of the conductor to substantially reduce the diameter thereof. Solder is then applied to the assembly which secures all of the compacted wires of the conductor in unit relation, after which the aluminum strip is removed since this will not be soldered together or to the wires. The resulting end of the conductor 19 has a diameter less than the diameter of the aperture 32 so that the ends may directly project therein. The ends of all of the conductors are treated in this manner and are extended into the apertures of the respective conductors 10 and 11 and are further soldered to the walls of the aperture, additional solder being provided for this purpose when necessary.

Another form of treating the ends of the conductors is illustrated in Fig. 7 wherein a very thin copper band 41 is applied to the end of the conductor by suitable compacting means, as by collet jaws, for drawing the band into a diameter small enough to project within the apertures 31 and 32. Solder is then applied to the end of the conductor and band to form a unit assembly. The compacted end, including the band, is then inserted in the respective apertures 31 and 32 and secured therein by the application of additional solder thereto.

In Figs. 8 and 9, a further form of the invention is illustrated, that wherein the conductors 42 and 43 of the terminal are preferably made of forgings, the conductor 42 having a cloverleaf end 44 with apertures 32 therein, while the conductor 43 has projecting fingers 45 so shaped and positioned as to receive the neck portion 29 below the cloverleaf end 44 and to extend about the cloverleaf portion to have the apertures 31 thereof disposed in spaced nonconducting relation to the apertures 32 of the conductors 42 and in a common plane therewith. In this construction, the length of the conductors 19 and 21 of the cable is the same, while in the cable illustrated in Fig. 2, the conductors 19 and 21 are of different length in view of the fact that the head portion 24 of the conductor 11 is spaced below the cloverleaf end 28 of the conductor 10. Otherwise, the conductors 42 and 43 are assembled in the same manner as conductors 10 and 11 of the terminal first referred to.

In either of the cables an aperture 46 extends through the two conductor portions and the insulating plate 12 through which a bolt, having an insulating sleeve thereover, extends for clamping a pair of conductors to flat sides 47 provided on the outer ends of the conductors of the terminal.

The aperture in the plate 12, as pointed out hereinabove, regulates the amount of water which is conducted to the inside and outside paths through the cable sheath. The ratio of the water through the cable should at least be equal and any variation therefrom should be such as to have the greatest amount of water pass through the central path of the cable.

The two lead terminal, illustrated and described herein by way of example, is constructed for a two lead cable having three conductors in each lead. It is to be understood that each lead of the cable may comprise any number of conductors, two, three, four or more. The number of apertures on the end of the two conductors of the terminals will correspond to the number of conductors in the respective leads. It will be noted further that each of the terminals has the flat portions 47, to which a conductor is connected, coated with a metal which is conductive when oxidized, such as silver or the like. This assures a proper area of conductive contact between the cable terminals and the terminals attached thereto after oxidation occurs. While it is stated that the flat portions 47 are so coated, it is to be understood that the entire area of the conductors or the entire area of the portion thereof projecting from the sheath 22 could be coated with the silver or like metals which are conductive when oxidized, as it may be more economical to place the lower half of the entire conductor in the plating bath to produce the coating.

What is claimed is:

1. A terminal for the end of a cable having two leads each lead consisting of a plurality of conductors alternately spaced on a circle, comprising two semicylindrical conducting elements spaced apart by an insulating plate, the end of one conducting element having an enlarged end spaced by a neck, said enlarged end having spaced apertures disposed parallel to the longitudinal length of the element, and a head on the other conducting element having a notch for receiving said neck, said head being spaced from the enlarged end and having a plurality of apertures therein disposed substantially parallel to said first apertures and positioned alternately relative thereto whereby each of the apertures of both conducting elements is aligned with a conductor of the respective leads of the cable.

2. A terminal for the end of a cable having two leads each lead consisting of a plurality of conductors alternately spaced on a circle, comprising two semicylindrical conducting elements spaced apart by an insulating plate, the end of one conducting element having an elarged end spaced by a neck, said enlarged end having spaced apertures disposed parallel to the longitudinal length of the element, and a head on the other conducting element having a notch for receiving said neck, said head being spaced from the enlarged end and having a plurality of apertures therein disposed substantially parallel to said first apertures and positioned alternately relative thereto whereby each of the apertures of both conducting elements is aligned with a conductor of the respective leads of the cable, one of the conducting elements having a water passageway communicating through an aperture in the insulating plate to a water passageway in the other conducting element to provide independent water passageways in the terminal to the respective leads of the cable.

3. A terminal for a cable comprising a pair of semicylindrical conductors spaced apart by an insulating plate, a head on one end of each of the conductors in axially aligned but in spaced relation to each other, one head having a slot, a neck supporting the other head from its conductor which is received by the slot when the conductors are assembled, and an insulating plate between said conductors of a thickness to form a cylindrical terminal therewith, with the heads in spaced separated relation and provided with apertures which when viewed from the end appear to be disposed on a circle about the axis of the terminal and substantially parallel to the longitudinal axis thereof, with the apertures in one of the heads alternately disposed relative to the apertures in the other head.

4. A terminal for a cable comprising a pair of semicylindrical conductors spaced apart by an insulating plate, a head on one end of each of the conductors in axially aligned but in spaced relation to each other, one head having a slot, a neck supporting the other head from its conductor which is received by the slot when the conductors are assembled, an insulating plate between said conductors of a thickness to form a cylindrical terminal therewith, with the heads in spaced separated relation and provided with apertures which when viewed from the end appear to be disposed on a circle about the axis of the terminal and substantially parallel to the longitudinal axis thereof, with the apertures in one of the heads alternately disposed relative to the apertures in the other head, a passageway for water through the one head and the neck on which it is supported, and an aperture through the plate connecting the water passageway in the one conductor to the water passageway of the other conductor.

5. A terminal having two semicylindrical conductors spaced apart by an insulating plate, a neck projecting from the end of one conductor having on the end thereof radially disposed fingers each containing an aperture, a head on the other conductor having a slot for receiving the neck of the first conductor and having apertures disposed in the end thereof in alternate relation and all offset from the apertures in the fingers of the conductor having the neck when the conductors are assembled to form a cylinder, with the apertures when viewed from the end appearing to be disposed in a circle about the longitudinal axis of the assembled conductors and substantially parallel to the longitudinal axis thereof, and means for insulating the conductors from each other.

6. A terminal having two semicylindrical conductors spaced apart by an insulating plate, a neck projecting from the end of one conductor having on the end thereof radially disposed fingers each containing an aperture, a head on the other conductor having a slot for receiving the neck of the first conductor and having apertures disposed in the end thereof in alternate relation and all offset from the apertures in the fingers of the conductor having the neck when the conductors are assembled to form a cylinder, with the apertures when viewed from the end appearing to be disposed in a circle about the longitudinal axis of the assembled conductors and substantially parallel to the longitudinal axis thereof, and means for insulating the conductors from each other, each of the conductors having a water passageway, the passageway in the one conductor extending through the neck and between the radially disposed fingers, the passageway in the other conductor communicating with said passageway in the first conductor through an aperture in the insulating means disposed therebetween.

7. A terminal having two semicylindrical conductors spaced apart by an insulating plate, a neck projecting from the end of one conductor having on the end thereof radially disposed fingers each containing an aperture disposed substantially parallel to the longitudinal axis of the conductor, the other conductor having outwardly projecting fingers which receive the neck and fingers of the projecting head of the first said conductor and having apertures provided therein which are substantially parallel to said first apertures and in alternate spaced relation thereto and coplanar therewith, an insulating material spacing said conductors.

8. A terminal having two semicylindrical conductors spaced apart by an insulating plate, a neck projecting from the end of one conductor having on the end thereof radially disposed fingers each containing an aperture disposed substantially parallel to the longitudinal axis of the conductor, the other conductor having outwardly projecting fingers which receive the neck and fingers of the projecting head of the first said conductor and having apertures provided therein which are substantially parallel to said first apertures and in alternate spaced relation thereto and coplanar therewith, and insulating material spacing said conductors, the one head having a fluid passageway extending through the first conductor which communicates through an aperture in the insulating material between the conductors for regulating the flow of water through the passageways.

9. A terminal for a cable which has a pair of leads made up of a plurality of alternately spaced conductors, comprising two semicyclindrical conducting elements each having portions at one end containing apertures which are disposed substantially parallel to the longitudinal axis of the conducting elements, with the apertures of one portion disposed in alternate relation to the apertures of the other portions to be in longitudinal alignment with the alternately related and spaced conductors of the two leads of the cable, the apertures in the ends of the conducting elements being smaller than the diameter of the conductors of the cables, the conductors of the cables having compressed soldered ends which are projectable within the apertures of the end of the conducting elements of the terminals.

10. A terminal for a cable which has a pair of leads made up of a plurality of alternately spaced conductors, comprising two semicylindrical conducting elements each having portions at one end containing apertures which are disposed substantially parallel to the longitudinal axis of the conducting elements, with the apertures of one portion disposed in alternate relation to the apertures of the other portions to be in longitudinal alignment with the alternately related and spaced conductors of the two leads of the cable, the apertures in the ends of the conducting elements being smaller than the diameter of the conductors of the cables, the conductors of the cables having compressed soldered ends which are projectable within the apertures of the end of the conducting elements of the terminals, and an insulating plate spacing the conducting elements of the terminals when secured together, the conducting elements having passageways for water the amount flowing therefrom being regulated by an aperture through the plate which joins the passageways of the respective conducting elements to each other.

11. In a terminal having two semicylindrical conductors spaced apart by an insulating plate forming a cylindrical assembly the center of which is located in said plate, a neck projecting from the end of one conductor having on the end thereof radially disposed fingers each containing an aperture which is radially disposed from a center approximately aligned with the center of the plate, each said finger having an aperture parallel to each other and to said centers, the end of said other conductor having a plurality of apertures radially disposed from the center which is aligned with the center of said plate and being alternately disposed relative to the apertures in said fingers, said end of the other conductor having a recess for receiving the neck of said first conductor so as to be in spaced relation thereto, the ends of said alternate apertures being disposed on a circle having a center aligned with the center of said plate.

12. A terminal having two semicylindrical conductors spaced apart by an insulating plate, one end of each of the conductors containing a plurality of apertures which are substantially parallel to the longitudinal axis of the conductors, the apertures of one of said conductors being disposed alternately with the apertures of the other conductors.

13. A terminal having two semicylindrical conductors spaced apart by an insulating plate, one end of each of the conductors containing a plurality of apertures which are substantially parallel to the longitudinal axis of the conductors, the apertures of one of said conductors being disposed alternately with the apertures of the other conductors, said conductors being made of copper having a coating of material thereon which when oxidized is conducting.

References Cited in the file of this patent

UNITED STATES PATENTS

| | | |
|---|---|---|
| 1,267,832 | Wilkinson | May 28, 1918 |
| 1,731,218 | Adams | Oct. 8, 1929 |
| 2,234,435 | Johnson | Mar. 11, 1941 |
| 2,302,839 | Burgett | Nov. 24, 1942 |
| 2,504,777 | Wreford | Apr. 18, 1950 |
| 2,588,436 | Violette | Mar. 11, 1952 |

OTHER REFERENCES

Uniflex Catalogue V, pages 1 to 4, received in Patent Office May 7, 1948. (Copy in Div. 65 in Class 174–15.)